United States Patent [19]
Sutherland et al.

[11] Patent Number: 5,805,838
[45] Date of Patent: Sep. 8, 1998

[54] FAST ARBITER WITH DECISION STORAGE

[75] Inventors: Ivan E. Sutherland, Santa Monica; Lee S. Tavrow, Sunnyvale, both of Calif.

[73] Assignee: Sun Microsystems, Inc., Palo Alto, Calif.

[21] Appl. No.: 655,999

[22] Filed: May 31, 1996

[51] Int. Cl.[6] .................................................. H01J 13/00
[52] U.S. Cl. ........................ 395/292; 395/729; 395/731; 395/298
[58] Field of Search ................................... 395/728, 729, 395/730, 731, 732, 292, 293, 298, 299, 300, 303, 305, 309, 287, 727

[56] References Cited

U.S. PATENT DOCUMENTS

| | | | |
|---|---|---|---|
| 4,425,633 | 1/1984 | Swain ........................................ | 365/194 |
| 4,679,213 | 7/1987 | Sutherland .................................. | 711/1 |
| 4,837,740 | 6/1989 | Sutherland .............................. | 364/900 |
| 5,132,932 | 7/1992 | Tobita ...................................... | 365/222 |
| 5,276,887 | 1/1994 | Haynie ..................................... | 395/728 |
| 5,404,522 | 4/1995 | Carmon et al. ......................... | 395/650 |
| 5,404,538 | 4/1995 | Krappweis, Sr. .......................... | 39/728 |
| 5,418,967 | 5/1995 | Simcoe et al. ........................... | 395/729 |
| 5,463,624 | 10/1995 | Hogg et al. .............................. | 370/85.6 |
| 5,475,850 | 12/1995 | Kahn ....................................... | 395/290 |
| 5,481,680 | 1/1996 | Larson et al. ............................ | 395/292 |
| 5,485,586 | 1/1996 | Brash et al. .............................. | 395/292 |
| 5,583,999 | 12/1996 | Sato et al. ................................ | 395/291 |
| 5,603,061 | 2/1997 | Hilley et al. ............................. | 395/864 |
| 5,713,025 | 1/1998 | Molnar et al. ........................... | 395/729 |

FOREIGN PATENT DOCUMENTS

| | | | |
|---|---|---|---|
| 0 175 880 | 7/1985 | European Pat. Off. .......... | G11C 7/00 |
| 0 644 549 A2 | 9/1994 | European Pat. Off. .......... | G11C 7/00 |

OTHER PUBLICATIONS

U.S. Application No. 08/303,247, filed Sep. 8, 1994.

Primary Examiner—Ayaz R. Sheikh
Assistant Examiner—Raymond N. Phan
Attorney, Agent, or Firm—Townsend and Townsend and Crew LLP

[57] ABSTRACT

Improved circuits for implementing various embodiments of high performance arbiters are disclosed. In one embodiment, a late-done arbiter is implemented by combining a late-decision arbiter with a decision storage (or queue) device. In another embodiment, an arbiter implementation that extends the amount of storage available for decisions is disclosed. A decision making device such as a simple arbiter is followed by a decision storage device such as a queue or a first in first out (FIFO) register of any number of stages. The decision storage device following the arbiter allows the arbiter to report each decision as quickly as it can and to start the next decision making cycle.

9 Claims, 5 Drawing Sheets

5,805,838

FAST ARBITER WITH DECISION STORAGE

BACKGROUND OF THE INVENTION

The present invention relates to electronic circuits, and in particular to improved methods and circuitry for implementing various embodiments of high performance arbiters.

An arbiter is a circuit element that permits only one of two competing users to have access to a protected process. When only one user requests access, access is promptly granted. When the user is finished with the service, it declares itself done. A user may make a second request anytime after receiving a grant signal even before declaring itself done. The second user may request access at any time, but if the first user has been granted access to the service, the grant for such a subsequent request will be delayed until the first user declares itself done. If both users request access at nearly the same time, one and only one will be granted service and the other delayed. In addition to taking into account of which request was received first, the decision as to which request is granted access first in the case of nearly simultaneous requests may depend on factors such as temperature gradients across the integrated circuit chip, fabrication conditions and the like. In any event, a decision as to which request is granted access first will be cleanly made.

A block diagram showing the terminal interface of a five-wire arbiter 100 is illustrated in FIG. 1. Two terminals 102 and 104 accept input request signals R1 and R2, respectively, and two corresponding terminals 106 and 108 generate output grant signals G1 and G2, respectively. This arbiter uses a transition signaling convention wherein it is the event of a signal transition that carries the information regardless of whether the signal is rising or falling. The logic circuitry using this type of signaling, sometimes referred to as event logic, need only detect and respond to signal transitions, and does not care about the direction of signal transition. It is to be understood, however, that other signaling conventions such as pulse signaling are also possible. Arbiter 100 responds to transitions on one or the other request input terminals 102 or 104, and eventually delivers an output transition on the corresponding grant output terminal. The critical job of the arbiter is to deliver only one output grant at a time, indicating which of the inputs it has selected. Successive grant outputs in response to subsequent request inputs must be separated by transitions on the fifth input terminal 110, labeled D for done.

The behavior of the five-wire arbiter and its environment can be shown by the state diagram of FIG. 2. The state diagram includes eight states forming a cube, with the initial state 1 indicated by a double circle. The cube specification sets forth the following rules:

1) Except for an initial request on each request input, the environment may make subsequent requests on R1 and R2 only after receiving the corresponding G1 or G2 signal.
2) The arbiter may deliver grants G1 or G2 only after receiving the corresponding R1 and/or R2 signals.
3) Except for one initial grant, the arbiter may deliver one additional grant on G1 or G2 only after an event on the fifth terminal D.
4) The environment must respond to each grant with a signal on D.

Rules 1 and 2 imply that R1 and G1 alternate, starting with R1, and that R2 and G2 likewise alternate starting with R2. Rules 3 and 4 imply that one of G1 or G2 alternates with D, starting with one of the G signals. Rule 3 requires the arbiter to produce only a single grant signal between D events even if there were two requests. This implies arbitration. Nothing in the cube specification, however, indicates how or when to make the arbitration decisions nor how to choose between conflicting requests.

An arbiter that meets the "cube" specification is often called a "sequencer." This designation focuses on the relationship between the grant signals G1 or G2, and the done signal D. The grant signals indicate successive arbitration decisions presented in sequence in response to actions of the done signal D. When the arbiter is called a sequencer, often the "done" terminal is labeled "next," conveying the message that the environment is ready to receive the next grant.

The cube specification says nothing about how the sequencer decides which grant to issue in cases involving conflict. The cube specification has no way to describe the behavior of the device over time. Thus designs with different delay properties and different decision criteria can all conform to the cube specification. Several such designs have been described in the past. The simplest arbiters follow a direct and literal interpretation of the cube specification of FIG. 2. Only after receiving the done signal D do such devices examine the input request signals and decide which grant to issue. They make decisions only in states 2, 3 and 4 of FIG. 2. The decision in states 2 and 3 is straightforward, but the decision in state 4 requires arbitration. This type of arbiter is referred to herein as a "late-decision" arbiter.

The principal drawback of the late-decision arbiter is its delay. The delay is particularly long from state 8 when both requests are pending and the done signal arrives last. The arbiter must choose which request to honor. Because the late-decision arbiter examines its inputs only after the done signal arrives, it has by then lost any information it may have had about which request arrived first. This forgetfulness has two adverse consequences. First, the grant must await the full decision process. Second, even though the requests may have arrived at very different times the decision element considers them at the same time. When such decision elements consider conflicting signals at the same time or at nearly the same time there is a higher probability that meta-stability will occur. Thus the decision may be further delayed. Even when only a single request has arrived, late-decision arbiters are relatively slow because the grant must await the full decision process.

A more complex form of arbiter is called a "late-done" arbiter. To produce a next grant output, the five-wire arbiter must have received both the corresponding input request and a done signal D. An exception to this is after initialization, when the arbiter is left in the state as if D has already occurred, and a grant output is produced following the receipt of an input request. The done signal does not play a role in the arbitration task, but sequences the grant signals. Input requests and D may occur in any order. However, if the environment in which the arbiter is to be used generally produces new input requests before D occurs, then a circuit implementation can take advantage of this fact to reduce the delay between the receipt of D and the issue of the grant signal.

Thus, a late-done arbiter decides in advance, if possible, which grant to issue next. The decision is usually based on which request arrived first, but might be based on other criteria. In a late-done arbiter the decision process is concurrent with the actions following a previous grant. If the next decision is complete by the time D arrives, the arbiter can announce its decision very soon thereafter. Thus the delay from D to the next grant can be greatly reduced. The name "late-done" refers to the fact that the done signal is involved only in the final stage of the arbiter. One implementation of a late-done arbiter is the subject of a commonly assigned U.S. Pat. application No. 08/303,247 (Attorney Docket No. P633X), filed Sep. 8, 1994, which is hereby incorporated by reference in its entirety for all purposes.

SUMMARY OF THE INVENTION

The present invention provides improved methods and circuitry for implementing various embodiments of high performance arbiters. In one embodiment, a late-done arbiter is implemented by combining a late-decision arbiter with a decision storage (or queue) device. In another embodiment, an arbiter implementation that extends the amount of storage available for decisions is disclosed. Broadly, this embodiment includes a decision making device followed by a decision storage device such as a queue or a first in first out (FIFO) register of any number of stages. The decision making device can be any type of arbiter. The decision storage device following the arbiter allows the arbiter to report each decision as quickly as it can and to start the next decision making cycle. This embodiment of an arbiter conforms to the cube specification.

Accordingly, the present invention provides in a first embodiment a late-done arbiter that includes a decision making device having a first and second request input terminals respectively coupled to a first and second request input terminals of the late-done arbiter, a first and second grant output terminals and a first and second done input terminals; and a decision storage device having a first and second input terminals respectively coupled to the first and second grant output terminals of the decision making device, a first and second acknowledge output terminals coupled to the first and second done input terminals of the decision making device, a first and second output terminals respectively coupled to a first and second grant terminals of the late-done arbiter, and a done input terminal coupled to a done input terminal of the late-done arbiter.

In a second embodiment, the present invention provides an arbiter including: a decision making device having a first and second request input terminals respectively coupled to arbiter first and second request input terminals, a first and second grant output terminals and a done input terminal; and a decision storage device having a first and second input terminals respectively coupled to the first and second grant output terminals of the decision making device, an acknowledge terminal coupled to the done input terminal of the decision making device, a first and second grant terminals respectively coupled to first and second grant terminals of the arbiter, and a done terminal coupled to a done terminal of the arbiter. The decision storage device is capable of storing one, two or more decisions.

In an alternate embodiment, the decision making device is coupled to two or more separate decision storage devices. Each decision made by the decision making device is applied to and stored in the separate decision storage devices to allow separate users to examine the decisions independently.

A better understanding of the nature and advantages of the improved arbiter implementation of the present invention may be had with reference to the detailed description and the drawings below.

DESCRIPTION OF SPECIFIC EMBODIMENTS

Figure 3:
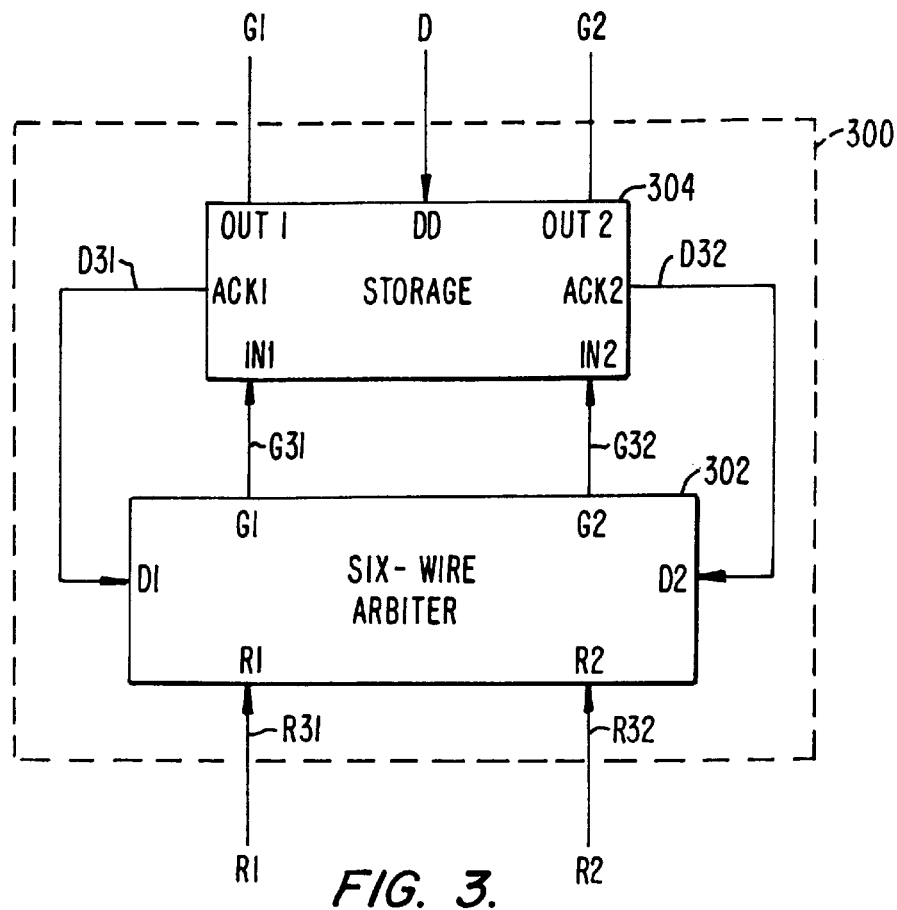
FIG. 3 is a block diagram for a five-wire late-done arbiter implemented by the combination of a simple arbiter and a decision storage device according to one embodiment of the present invention.

Referring to FIG. 3, there is shown a block diagram for a five-wire late-done arbiter 300 according to one embodiment of the present invention. Arbiter 300 is made up of a six-wire simple arbiter 302 connected to a two-channel decision storage device 304. Six-wire arbiter 302 has two input request terminals R31 and R32 that receive the arbiter request signals R1 and R2, two output grant terminals G31 and G32, and two input done terminals D31 and D32. Two input terminals IN1 and IN2 of decision storage device 304 connect to the two output grant terminals G31 and G32, respectively, and two output terminals OUT1 and OUT2 of decision storage device 304 connect to arbiter grant terminals G1 and G2, respectively. Decision storage device 304 also generates two acknowledge signals ACK1 and ACK2 that respectively connect to the two done terminals D1 and D2 of six-wire arbiter 302. Decision storage device 304 receives the arbiter done signal D at an input DD.

Similar to the five-wire arbiter, the function of six-wire arbiter 302 is to select between two possibly concurrent input requests, each of which may request again only after the arbiter gives the corresponding grant. Six-wire arbiter 304, however, has two separate done signals D31 and D32 corresponding to the two request inputs, separately indicating that a next grant may be given. Six-wire arbiter 302 may be a simple late-decision arbiter, a more detailed embodiment of which is described in connection with FIG. 5.

Figure 4:
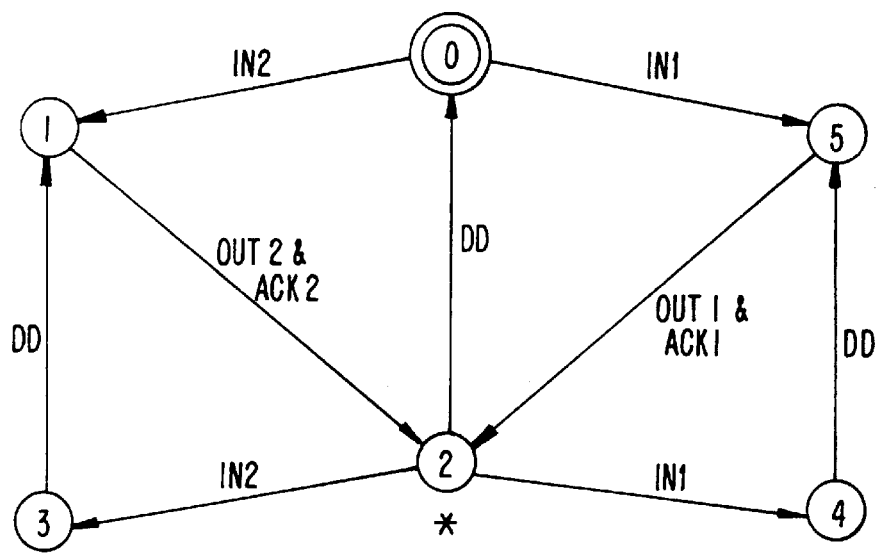
FIG. 4 is a state diagram showing the operation of the decision storage device of the late-done arbiter of FIG. 3.

Decision storage device 304 is preferably a special kind of FIFO referred to herein as a transition queue. A FIFO typically refers to a storage device that accepts a set of data elements in sequence and delivers them in the same sequence on demand, while in the transition queue, the data elements provide their own timing. Various implementations of such transition queues are the subject of U.S. Pat. No. 4,679,213, to Ivan E. Sutherland, which is hereby incorporated by reference in its entirety for all purposes. Decision storage device 304 uses a four-wire interface protocol wherein two terminals (IN1 and IN2) carry transition signals in the forward direction from wires G31 and G32, respectively, and two wires (D31 and D32) carry transition signals (ACK1 and ACK2) in the reverse direction. Decision storage device 304 produces a transition on OUT1 in response to a transition on IN1 and a transition on DD. Similarly, decision storage element 304 produces a transition on OUT2 in response to a transition on input IN2 and a transition on input DD. Six-wire arbiter 302 avoids concurrent transitions on both input IN1 and input IN2. The dot ● by the DD terminal indicates that after initialization, decision storage device 304 is left in the state as if a transition on DD has already occurred. The operation of decision storage device 304 is shown by the six-state state diagram of FIG. 4. As shown in the state diagram of FIG. 4, the initial state is state 0 at the top of the diagram rather than state 2 which is the conventional initial state for such a two-channel decision storage device.

Figure 5:
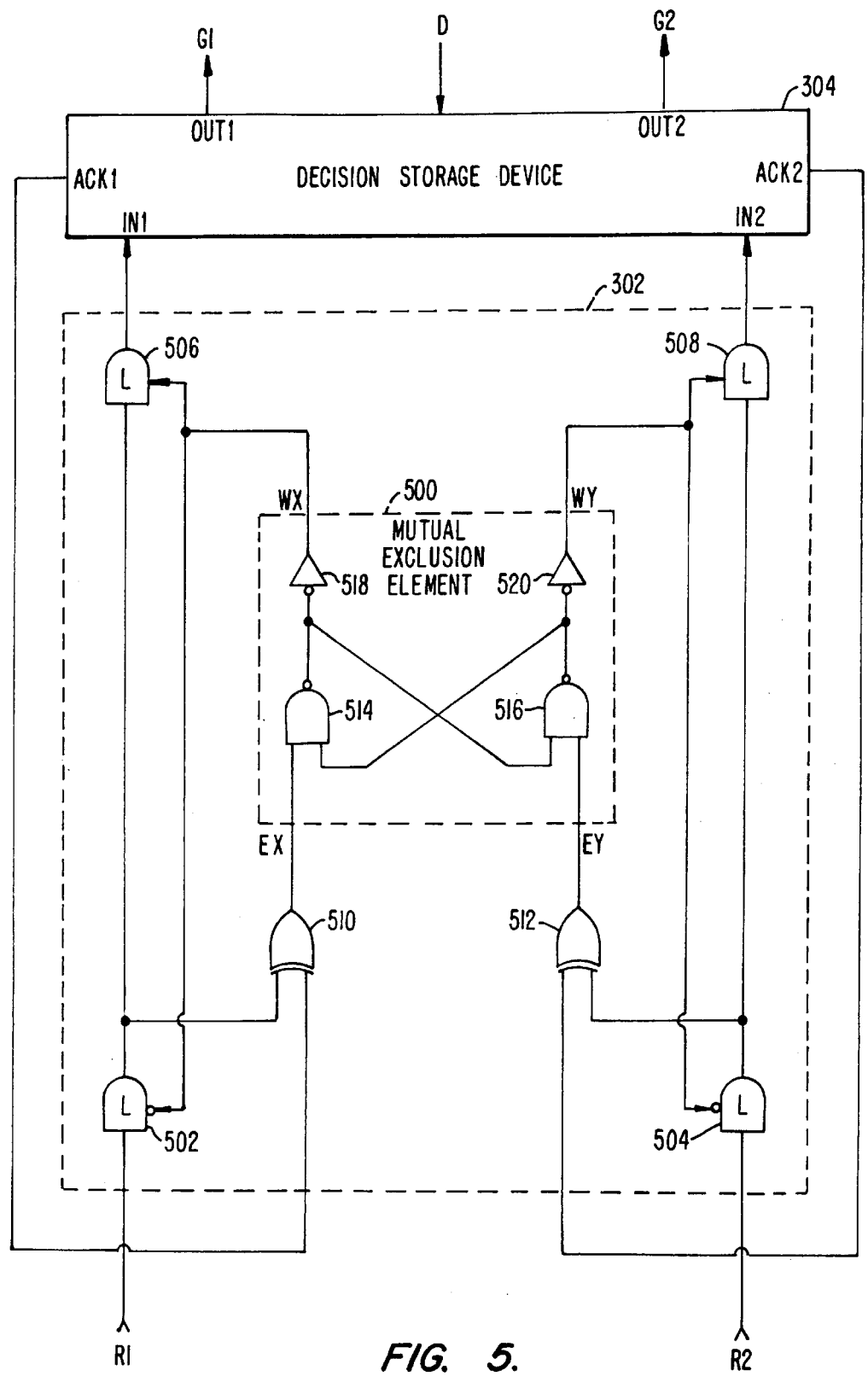
FIG. 5 is an exemplary logical implementation of the five-wire late-done arbiter of FIG. 3 showing its arbiter portion in greater detail.

FIG. 5 shows an exemplary embodiment of the five-wire late-done arbiter of the present invention in greater detail. The same reference numerals are used in FIGS. 3 and 5 to refer to the same elements. Six-wire arbiter 302 includes a first pair of latches 502 and 504 that receive the input request signals R1 and R2. The outputs of latches 502 and 504 respectively feed the inputs of a second pair of latches 506 and 508, as well as an input of a pair of exclusive OR (XOR) gates 510 and 512. The other inputs of XOR gates 510 and 512 receive the acknowledge signals ACK1 and ACK2 from decision storage device 304. The outputs of XOR gates 510 and 512 drive the inputs of a mutual exclusion element 500. Mutual exclusion element 500 is made up of a pair of cross-coupled NAND gates 514 and 516 each driving an inverter 518 and 520, respectively. The outputs of mutual exclusion element 500 control the enable inputs of first and second pairs of latches 502, 504, and 506, 508, respectively, in a complementary fashion. Mutual exclusion element 500 locks out the last signal to arrive at its two inputs EX and EY. Inverters 518 and 520 supply the outputs WX and WY, only one of which can ever be at a high logic state at a time. If the input signals EX and EY enter at exactly the same time, mutual exclusion element 500 will enter a meta-stable state. Under this condition, neither output is high. This is ensured by skewing the size ratios of transistors used in the NAND gates and inverters, which adjusts the switching threshold for these gates to generate a logic low output when in meta-stable state.

Figure 1:
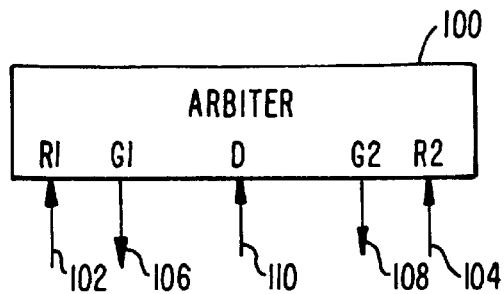
FIG. 1 is a block diagram showing the terminal interface of a five-wire arbiter.
Figure 2:
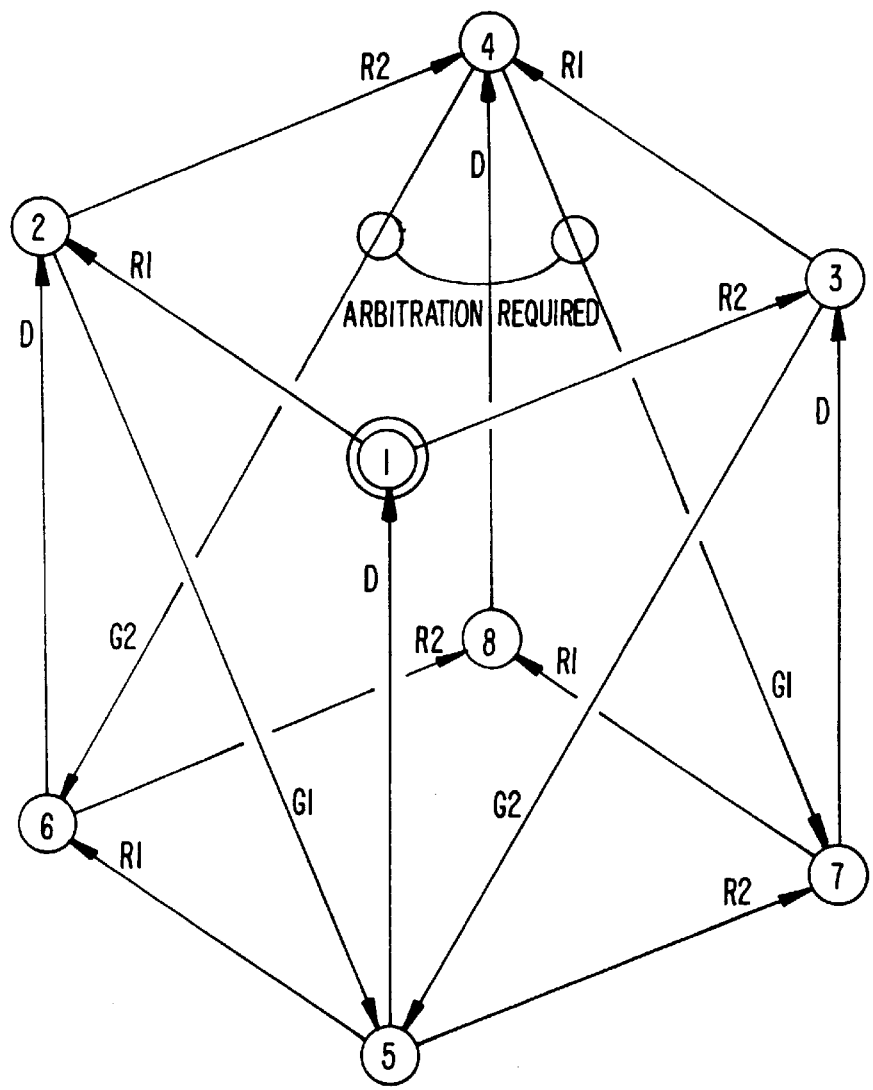
FIG. 2 is a state diagram showing the operation of a five-wire arbiter and its environment.

The combination of the simple six-wire arbiter and a single stage transition queue as shown in FIG. 3 conforms to the cube specification of FIG. 2 and provides a novel implementation for a five-wire late-done arbiter that has the capability to store one decision. The amount of storage available for decisions can be extended by increasing the number of stages of the decision storage device. In the embodiment shown in FIG. 6, the present invention offers an arbiter system that is capable of storing two or more decisions. The arbiter system according to this embodiment includes a decision making device 600 followed by a decision storage device 602 of two or more stages. Decision making device 600 can be any type arbiter, including the simplest form of arbiter such as a late-decision arbiter, and decision storage device 602 may be a FIFO or a transition queue of any desired length. Building FIFOs or transition queues of various lengths is the subject of U.S. Pat. No. 4,679,213, dated Jul. 7, 1987, which is hereby incorporated by reference in its entirety for all purposes.

Decision storage device 602 allows decision making device 600 to report each decision as quickly as it can and to start the next decision making cycle. As soon as decision making device 600 reports its first decision, decision storage device 602 records that decision and takes responsibility for reporting it when needed. This liberates decision making device 600 to make a second decision. Decision storage device 602 records as many such decisions as decision making device 600 provides or as many as it can hold, and delivers them at its output terminals in the proper sequence. The system of FIG. 6 conforms to the cube specification. The cube specification demands only that grants be made in response to requests. It is silent about when the required decisions should be made, and also silent about how to make them. The cube specification demands only that the grants be reported in response to signals on the done terminal D.

Figure 6:
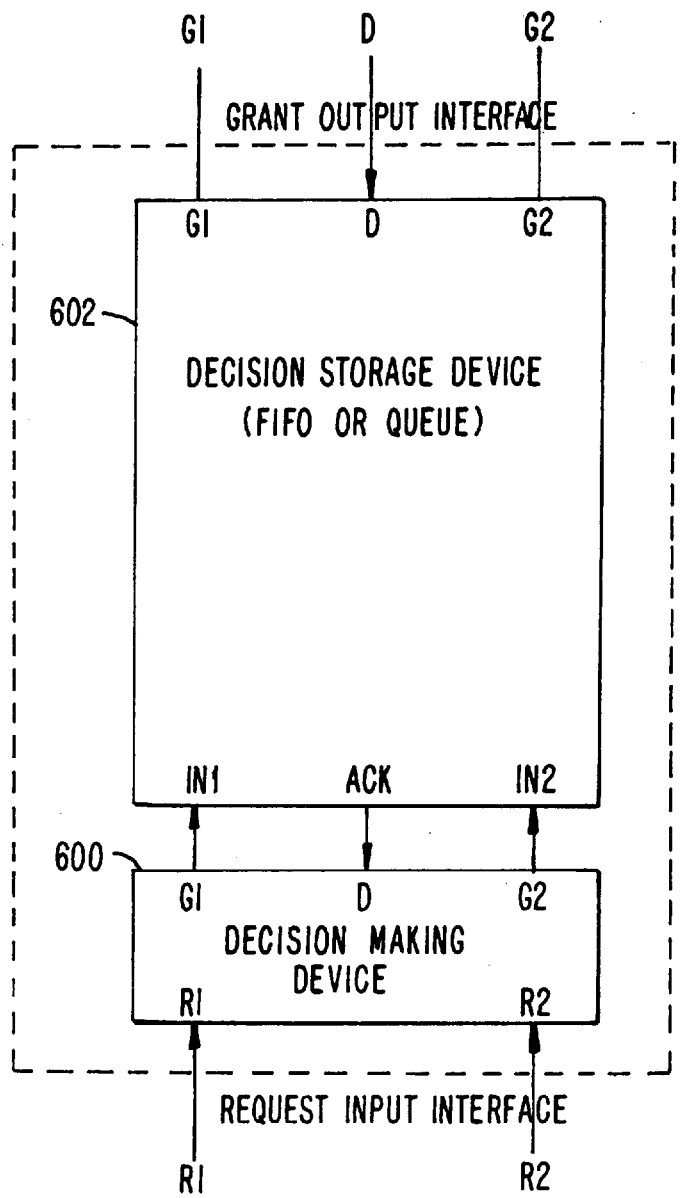
FIG. 6 is a block diagram of an arbiter with decision storage device according to the present invention.

An examination of the operation of the system of FIG. 6 reveals that conformance to the cube specification requires storing no more than two advance decisions. Suppose the system has issued a grant and awaits a done, signal, a state corresponding to states 5, 6, 7 or 8 of FIG. 2. At most two additional requests may be pending, the case corresponding to state 8 in FIG. 2. Decision making device 600 may therefore have made at most two further decisions in response to the first and the second request. The order in which those decisions appear in the queue records which of the two requests will be granted first, and which second. The arbiter awaits only the D signal before reporting the first of these decisions and stands ready to report the second decision promptly upon receipt of a second D signal.

As mentioned above, the cube specification restricts the environment as well as the decision making device. The cube specification requires that requests and grants alternate. Thus, while awaiting the D signal, the system will have issued at most one grant and the environment may have made at most one further request on each of the request terminals for a total of two. It follows that for devices and environments that follow the cube specification, at most two stages of FIFO or queue can ever be occupied. Providing additional stages, while not useful when implementing the cube specification, does not hamper the operation of the system. The advance decision making capability of the system of FIG. 6 permits quicker successive announcements of judgements which allows the user of a grant to proceed with the next cycle sooner. This is particularly useful in, for example, processing systems where a memory array is being accessed by several central processing units. In such an application, making decisions in advance allows the memory array to be busy more of the time.

The system of FIG. 6 may use a simple late-decision arbiter as decision making device 600 and a transition queue for decision storage device 602. These provide the simplest explanation at the block diagram level of how the device works. Alternatively one could implement the system of FIG. 6 using a mutual exclusion element as decision making device 600 and a FIFO to provide the storage.

Figure 7:
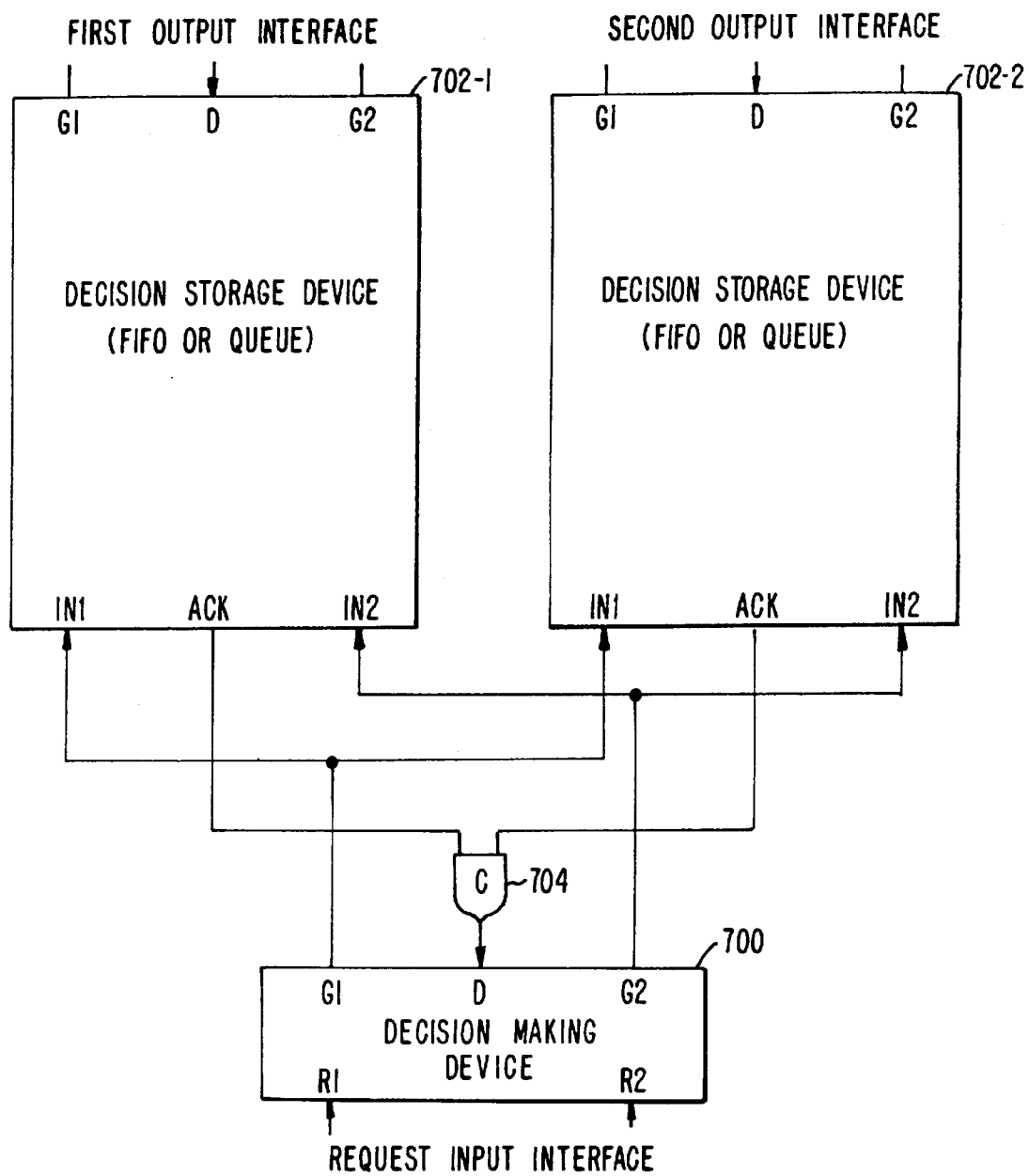
FIG. 7 is a block diagram of an arbiter with two decision storage devices.

In some applications several separate output queues prove useful. FIG. 7 illustrates a design with two such output queues. It is to be understood, however, that a greater number of separate queues could be included. The system of FIG. 7 is referred to herein as a dual-queue arbiter. Two independent channels supply each decision made by a decision making device 700 to two separate decision storage devices or queues 702-1 and 702-2 that provide two separate output interfaces. Acknowledge signals from each queue are combined by a combining gate 704 and applied to the done input D of decision making device 700. The dual-queue system of FIG. 7 allows two separate users to examine these decisions at their separate leisure. The sequence in which the decisions were made will be evident to each user, but either of the two separate users may examine the decisions before or after the corresponding action of the other user. Restrictions on the behavior of the environment remain. Just as for the cube specification, the environment must observe a grant for each request before issuing another request. In this embodiment, however, the observed grant may be seen on either output channel.

The dual-queue arbiter is specially useful in parallel processing applications where two separate users rely on the decisions made by the arbiter but may use the decisions at different times. In particular, one of the two users may process a particular decision sooner than the other, and therefore be able to use the next decision sooner. By offering a separate output interface to each of the two users, the dual-queue system of FIG. 7 permits each user to proceed at its own pace without waiting for the other user. The queues serve to decouple the decision making from the processes that use the decisions.

In conclusion, the present invention provides various embodiments for an improved arbiter design that is capable of making decisions in advance and storing the advance decisions to speed up the throughput of the arbiter. According to an embodiment of the invention, a decision making device such as a late-decision arbiter is combined with a decision storage device such as a FIFO or transition queue of any number of stages. While the above is a complete description of several embodiments of the present invention, it is possible to use various alternatives, modifications and equivalents. The scope of the present invention should therefore be determined not with reference to the above description but should, instead, be determined with reference to the appended claims, along with their full scope of equivalents.

What is claimed is:

1. A late-done arbiter comprising:
   a decision making device having first and second request input terminals respectively coupled to first and second request input terminals of the late-done arbiter, first and second grant output terminals and first and second done input terminals; and
   a decision storage device including:
      first and second input terminals respectively coupled to the first and second grant output terminals of the decision making device,
      first and second acknowledge output terminals coupled to the first and second done input terminals of the decision making device,
      first and second output terminals respectively coupled to first and second grant terminals of the late-done arbiter, and
      a done input terminal coupled to a done input terminal of the late-done arbiter,
   wherein, the decision storage device stores a first decision output of the decision making device allowing the late-done arbiter to asynchronously initiate a subsequent arbitration before receipt of a done signal.

2. The late-done arbiter of claim 1 wherein the decision making device is a six-wire arbiter of the late-decision type.

3. The late-done arbiter of claim 2 wherein the decision storage device is a single stage first in first out register for storing one decision.

4. The late-done arbiter of claim 2 wherein the decision storage device is a single stage transition queue for storing one decision.

5. The late-done arbiter of claim 2 wherein the six-wire arbiter comprises:
   a first latching circuit having first and second request input terminals respectively coupled to a first and second request input terminals of the late-done arbiter, first and second output terminals, and first and second enable input terminals for respectively enabling the first and second output terminals of the first latching circuit;
   first and second exclusive OR circuits, said first exclusive OR circuit having a first input terminal coupled to the first output terminal of said first latching circuit, a second input terminal coupled to the first acknowledge output terminal of the decision storage device, and an output terminal, and, said second exclusive OR circuit having a first input terminal coupled to the second output terminal of said first latching circuit, a second input terminal coupled to the second acknowledge output terminal of the decision storage device, and an output terminal;
   a mutual exclusion element having first and second input terminals respectively coupled to the output terminal of the first exclusive OR circuit and to the output terminal of the second exclusive OR circuit, and, first and second mutual exclusion output terminals respectively coupled to the first and second enable input terminals of the first latching circuit; and
   a second latching circuit having first and second input terminals respectively coupled to the first and second output terminals of the first latching circuit, first and second output terminals respectively coupled to the first and second input terminals of the decision storage device, and first and second enable input terminals for respectively enabling said first and second output terminals of the second latching circuit, said first and second enable input terminals of the second latching circuit respectively coupled to the first and second output terminals of the mutual exclusion element.

6. An arbiter circuit comprising:
   a decision making device having a first request input terminal for receipt of a first system request signal, and a second request input terminal for receipt of a second system request signal, a first grant terminal and a second grant terminal, and a done terminal; and
   a decision storage device including:
      a first input terminal coupled to the first grant terminal,
      a second input terminal coupled to the second grant terminal,
      an acknowledge terminal coupled to the done terminal,
      a first output terminal supplying a first system grant signal,
      a second output terminal supplying a second system grant signal, and
      a system done input terminal,
   wherein, the decision storage device stores a first decision output of the decision making device allowing the arbiter to asynchronously initiate a subsequent arbitration before receipt of a done signal.

7. The arbiter circuit of claim 6 wherein the decision storage device is a first in first out register having at least two stages.

8. The arbiter circuit of claim 6 wherein the decision storage device is a transition queue having at least two stages.

9. An arbiter circuit comprising:
   a decision making device having a first request input terminal for receipt of a first system request signal, and a second request input terminal for receipt of a second system request signal, a first grant terminal and a second grant terminal, and a done terminal;
   a first decision storage device having a first input terminal coupled to the first grant terminal, a second input terminal coupled to the second grant terminal, a first acknowledge terminal, a first output terminal supplying a first system grant signal, a second output terminal supplying a second system grant signal, and a first system done input terminal;
   a second decision storage device having a first input terminal coupled to the first grant terminal, a second input terminal coupled to the second grant terminal, a second acknowledge terminal, a first output terminal supplying a third system grant signal, a second output terminal supplying a fourth system grant signal, and second system done input terminal; and
   a combining circuit having a first and a second input terminals coupled to the first and second acknowledge terminals, respectively, and an output terminal coupled to the done terminal of the decision making device.

* * * * *